(12) United States Patent
Schneider

(10) Patent No.: US 8,196,192 B2
(45) Date of Patent: Jun. 5, 2012

(54) SETTING A PRELIMINARY TIME ON A NETWORK APPLIANCE USING A DIGITAL CERTIFICATE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1007 days.

(21) Appl. No.: 11/974,713

(22) Filed: Oct. 15, 2007

(65) Prior Publication Data

US 2009/0100512 A1    Apr. 16, 2009

(51) Int. Cl.
    *G06F 21/00*    (2006.01)
(52) U.S. Cl. ........................................................ 726/10
(58) Field of Classification Search .................. 713/178; 726/10, 2
    See application file for complete search history.

(56) References Cited

U.S. PATENT DOCUMENTS

| | | | |
|---|---|---|---|
| 6,940,979 B1 * | 9/2005 | Bobbitt | 380/277 |
| 7,392,377 B2 | 6/2008 | Ogg et al. | |
| 7,409,557 B2 | 8/2008 | Teppler | |
| 2002/0128925 A1 | 9/2002 | Angeles | |
| 2002/0178354 A1 | 11/2002 | Ogg et al. | |
| 2005/0076204 A1 * | 4/2005 | Thornton et al. | 713/156 |
| 2005/0138426 A1 | 6/2005 | Styslinger | |
| 2005/0160272 A1 | 7/2005 | Teppler | |
| 2006/0080536 A1 | 4/2006 | Teppler | |
| 2006/0156011 A1 * | 7/2006 | Masui | 713/178 |
| 2007/0192325 A1 | 8/2007 | Morris | |
| 2007/0288247 A1 | 12/2007 | Mackay | |
| 2008/0082662 A1 | 4/2008 | Dandliker et al. | |
| 2008/0307508 A1 * | 12/2008 | Conley et al. | 726/4 |
| 2009/0100512 A1 | 4/2009 | Schneider | |

OTHER PUBLICATIONS

Mills, David L., "Network Time Protocol (Version 3) Specification, Implementation and Analysis," Network Working Group, Request for Comments: 1305, Obsoletes: RFC-1119, RFC-1059, RFC-958, University of Delaware, Mar. 1992, 120 pages.
Final Office Action for U.S. Appl. No. 11/985,464, mailed Sep. 14, 2011.
Final Office Action for U.S. Appl. No. 11/985,464, mailed Nov. 24, 2010.
Office Action for U.S. Appl. No. 11/985,464, mailed Jun. 9, 2010.

* cited by examiner

*Primary Examiner* — Gilberto Barron, Jr.
*Assistant Examiner* — Devin Almeida
(74) *Attorney, Agent, or Firm* — Lowenstein Sandler PC

(57) ABSTRACT

A method and system for setting a time on a network appliance. The method may include attempting to establish a secure connection with a server using a certificate issued for a network appliance, and determining that an attempt to establish a secure connection has failed. The method may further include determining that a possible cause of the failure to establish a secure connection is incorrect time data provided by the network appliance, and updating the time on the network appliance using time data contained in the certificate.

23 Claims, 5 Drawing Sheets

SETTING A PRELIMINARY TIME ON A NETWORK APPLIANCE USING A DIGITAL CERTIFICATE

TECHNICAL FIELD

Embodiments of the present invention relate to network appliances, and more specifically to setting a preliminary time on a network appliance using a digital certificate.

BACKGROUND

A network appliance may be a computing device (e.g., a desktop computer, laptop computer, a router, etc.) that communicates with a server via a network. To ensure privacy and security during communication between the network appliance and the server, authentication and verification mechanisms may be used. One such mechanism is known as a public key infrastructure system.

In a public key infrastructure system, a network appliance may send a certificate signing request (CSR) to a certificate authority in order to apply for a signed identity certificate. Before creating a CSR, the network appliance may first generate a key pair (including a public key and a private key), keeping the private key secret. The CSR may contain information identifying the network appliance (e.g., its distinguished name in the case of an X.509 certificate), and the public key generated by the network appliance. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may then used by the network appliance to authenticate itself to the server and other networked devices that trust the certificate authority.

A network appliance may perform various functions (e.g., monitoring network characteristics, monitoring devices on the network, indexing local network resources, etc.) that depend on the network appliance having an accurate time base. Initial time data may be provided to the network appliance via designated time servers. For systems using secure communication, time servers may only be accessible behind an https proxy that requires client certificate authentication. The client certificate authentication will not be successful when the time of the network appliance is too far in the past, which may happen if, for example, the hardware clock of the network appliance has failed, the on-board battery that keeps the clock of the network appliance running during shutdown is dead, etc. If the authentication fails, the network appliance will not be able to obtain accurate time data from the time server. As a result, the network appliance will not function properly until an operator intervenes and resets the time on the network appliance.

BRIEF DESCRIPTION OF THE DRAWINGS

The present invention is illustrated by way of example, and not by way of limitation, and can be more fully understood with reference to the following detailed description when considered in connection with the figures in which:

FIG. 1 illustrates an exemplary network architecture in which embodiments of the invention may operate;

FIG. 2 illustrates a data flow diagram that shows data transmitted between a network appliance and a service provider, in accordance with one embodiment of the invention;

FIG. 3 is a flow diagram of one embodiment of a method for setting time on a network appliance based on a certificate issued for the network appliance;

FIG. 4 is a flow diagram of one embodiment of a method for determining a possible cause for a network appliance's failure to establish a secure connection with a server; and FIG. 5 illustrates a diagrammatic representation of a machine in the exemplary form of a computer system, in accordance with one embodiment of the present invention.

DETAILED DESCRIPTION

Described herein is a method and system for setting time on a network appliance using a certificate issued for the network appliance. In one embodiment, a network appliance attempts to establish a secure connection with a server using a certificate issued for the network appliance, and determines that its attempt to establish the secure connection has failed. Next, the network appliance determines whether a possible cause of this failure is incorrect time provided by the network appliance. If so, the network appliance sets a preliminary time on the network appliance by extracting time data contained in the certificate and updating the network appliance's time using the time data extracted from the certificate. After setting the preliminary time, the network appliance can request an exact time from a time server.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
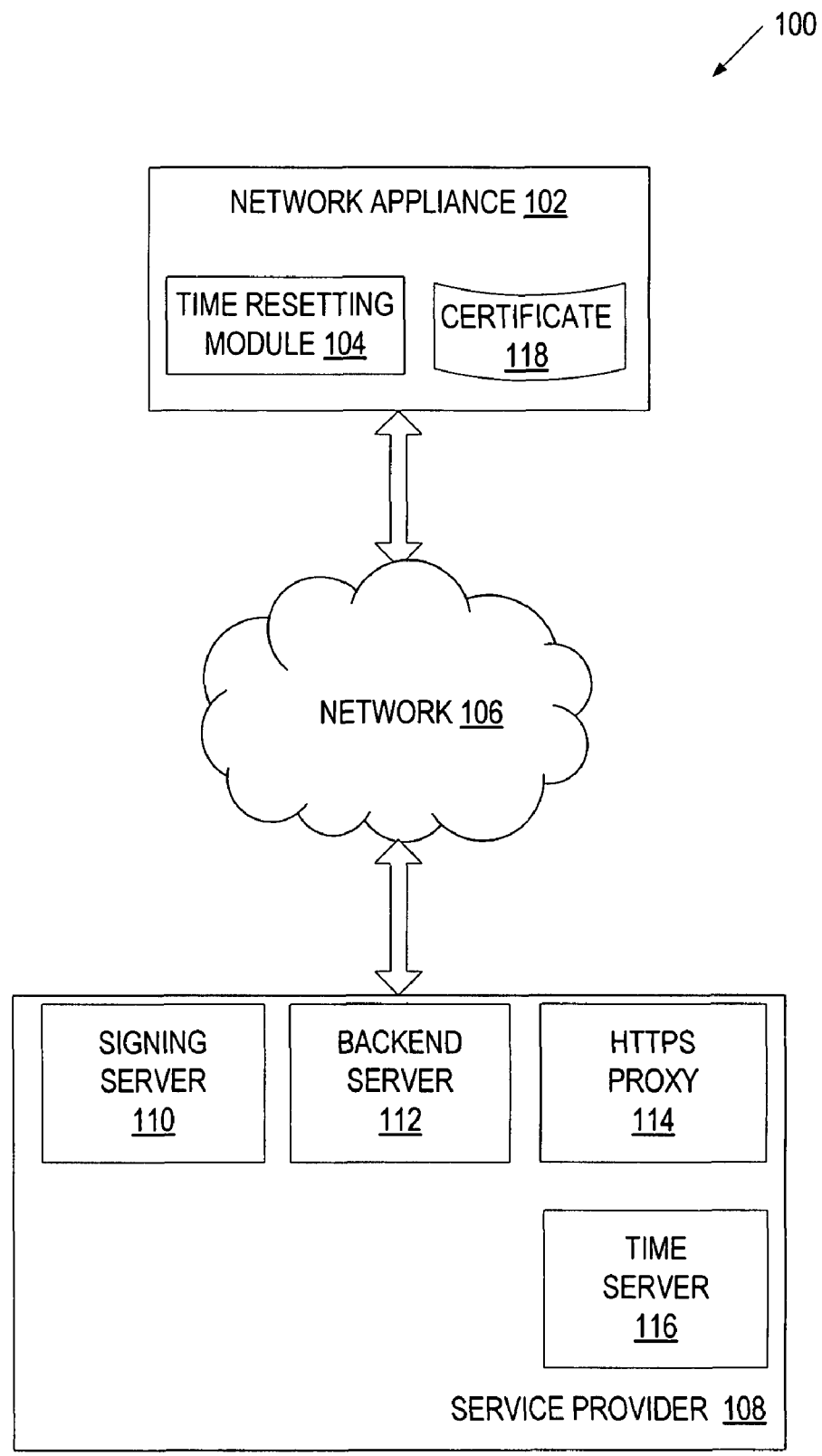

FIG. 1 illustrates an exemplary network architecture 100 in which embodiments of the present invention may operate. The network architecture 100 may include a service provider 108 connected with a network appliance 102 via a network 106 (e.g., a public network such as Internet or a private network such as Intranet or a virtual private network (VPN)). The network appliance 102 may be part of a customer network (e.g., a local area network (LAN), wide area network (WAN), etc.) that may be a network of an enterprise and may include such devices as desktop computers, laptop computers, network printers, switches, routers, gateways, firewalls, or any other devices having a network address. The network appliance 102 may be a computing device (e.g., a desktop computer, a laptop computer, a router, etc.) that is configured to perform a network related function such as monitoring of the customer network, collecting operational characteristics of devices on the customer network, etc.

The service provider 108 may receive information provided by the network appliance 102, analyze this information, and provide alerts and various reports to an administrator of the customer network. Alternatively, the network appliance 102 may collect other types of data, and the service provider 140 may use the network appliance 102 to provide other services, such as banking, database management, etc. Yet alternatively, the network appliance 102 may be configured to perform indexing of local network resources, and the service provider 108 may receive index data from the network appliance, store the index data in a data store and/or use the index data for the operation of its search engine.

In one embodiment, the functionality of the network appliance 102 is automatically activated upon completion of a provisioning process. The provisioning process may include obtaining an identity certificate (also known as a digital certificate, signed certificate, public key certificate, client x.509 certificate, etc.) for the network appliance 102 and configuring the network appliance 102 based on configuration information provided by the service provider 108.

The identity certificate may be obtained by generating a certificate signing request (CSR), sending the CSR to a certificate authority, and receiving a valid identity certificate from the certificate authority. The CSR may be generated using a public key pair (a public key and a private key) generated by the network appliance 102. In particular, the CSR may include the public key bundled with additional information such as credentials and information identifying the network appliance 102, with the bundle being signed by the private key.

In one embodiment, the service provider 108 hosts a signing server 110 that represents a certificate authority. The signing server 110 determines whether the CSR received from the network appliance 102 should be signed (e.g., if the credentials and the identifying information are satisfactory). If so, the signing server 110 signs the CSR with its private key, and sends the resulting identity certificate 118 to the network appliance 102.

The network appliance 102 stores the identity certificate 118 in a local data store to use it for secure communication with the service provider 108 and other entities that trust the signing server 110. In particular, the network appliance 102 may use the identity certificate 118 to establish a secure connection with the service provider 108 for receiving configuration information from the service provider 108.

The service provider 108 may host a back-end server 112 responsible for providing the configuration information and for exchanging other data with the network appliance 102. The back-end server 112 may communicate with the network appliance 102 directly or via an https proxy (e.g., an https proxy 114). Before accepting a secure connection with the network appliance 102, the back-end server 112 or the https proxy authenticates the network appliance 102 to verify its identity. In particular, the back-end server 112 or the https proxy determines whether a certificate is required and if so, whether the certificate 118 provided by the network appliance 102 is valid (e.g., was issued to the requester of the secure connection, has not been revoked, has not expired, etc.). The certificate 118 may not be provided by the network appliance 102 if the network appliance 102 determines that its current time is outside of a valid time window as defined by the time included in the certificate 118. If the time of the network appliance 102 is too far in the past, the certificate 118 will not be provided, causing the back-end server 112 or the https proxy to fail the authentication of the network appliance 102. The time of the network appliance 102 may be too far in the past, if for example, the hardware clock of the network appliance 102 has failed, the on-board battery that keeps the clock of the network appliance 102 running during shutdown is dead, etc. Even if the certificate 118 is provided, the back-end server 112 or the https proxy will still fail the authentication if the certificate 118 provided by the network appliance 102 is invalid.

In one embodiment, the network appliance 102 hosts a time resetting module 104 that is responsible for correcting the time of the network appliance 102. Specifically, when the time resetting module 104 is notified that the attempt to establish a secure connection with the service provider 108 (or any other entity trusting the signing server 110) has failed, the time resetting module 104 determines whether a possible cause of this failure is incorrect time of the network appliance 102. In one embodiment, the time resetting module 104 makes this determination by first sending a request to the back-end server 112 (e.g., via an insecure channel) for a status of the certificate 118. If the back-end server 112 confirms the validity of the certificate 118, the time resetting module 104 assumes that the failure was caused by incorrect time of the network appliance 102.

Upon determining that the failure was caused by incorrect time, the time resetting module 104 corrects this timing problem. One solution would be to use time server(s) 116 maintained by the service provider 106 to provide accurate time. However, in secure communication systems, the time server 116 may only be accessible via the https proxy 114. As discussed above, the https proxy 114 requires certificate authentication that will not be successful if the time of the network appliance 102 is too far in the past (e.g., the network time protocol (NTP) will synchronize the clocks only if the difference between the clocks does not exceed 30 minutes). Hence, the time resetting module 104 first sets the time of the network appliance 102 to a preliminary time value that is close to the actual time, and then obtains the exact time from the time server 116.

In one embodiment, the time resetting module 104 determines a preliminary time value by extracting time data from the certificate 118. For example, the certificate 118 may include notValidBefore time (the time of singing the certificate 118) and notValidAfter time (the time after which the certificate 118 should expire). The time resetting module 104 may extract the notValidBefore time from the certificate 118 and use this time to reset the time of the network appliance 102. In particular, the time of the network appliance 102 may be updated with the notValidBefore time or with the notValidBefore time plus a predefined offset.

Next, the time resetting module 104 obtains an accurate time value from the time server 116 and resets the time of the network appliance 102 using the time value received from the time server 116. Even though the preliminary time may not be exactly accurate, it should be close enough to allow successful authentication of the network appliance 102 by the https server 114. Alternatively, if the authentication fails because the preliminary time is still too far in the past, the time resetting module 104 adjusts the preliminary time by incrementing it by a predefined interval. If the adjusted time does not exceed the notValidAfter value contained in the certificate, processing logic resubmits the request for current time to the time server.

In another embodiment, the time resetting module 104 determines whether a possible cause of the failed connection is incorrect time of the network appliance 102 by first determining whether the current time setting of the network appliance 102 precedes the time contained in the certificate 118. If so, the time resetting module 104 resets its time using the time from the certificate 118 and proceeds as discussed above. If the current time setting of the network appliance 102 is within the valid window (does not significantly precedes the time from the certificate 118), the time resetting module 104 sends a request to the back-end server 112 for a status of the certificate 118. The request may be sent via a secure connection but without a certificate because the certificate is not required in this context. That is, the communication regarding the certificate status may be achieved while the back-end server 112 is still authenticated to the network appliance 102 but without requiring the network appliance 102 to be authenticated to the back-end server 112.

It should be noted that the servers 110 through 116 may share the same machine or be hosted by two or more independent machines. In addition, any of the servers 110 through 116 may reside externally to the service provider 108.

Figure 2:
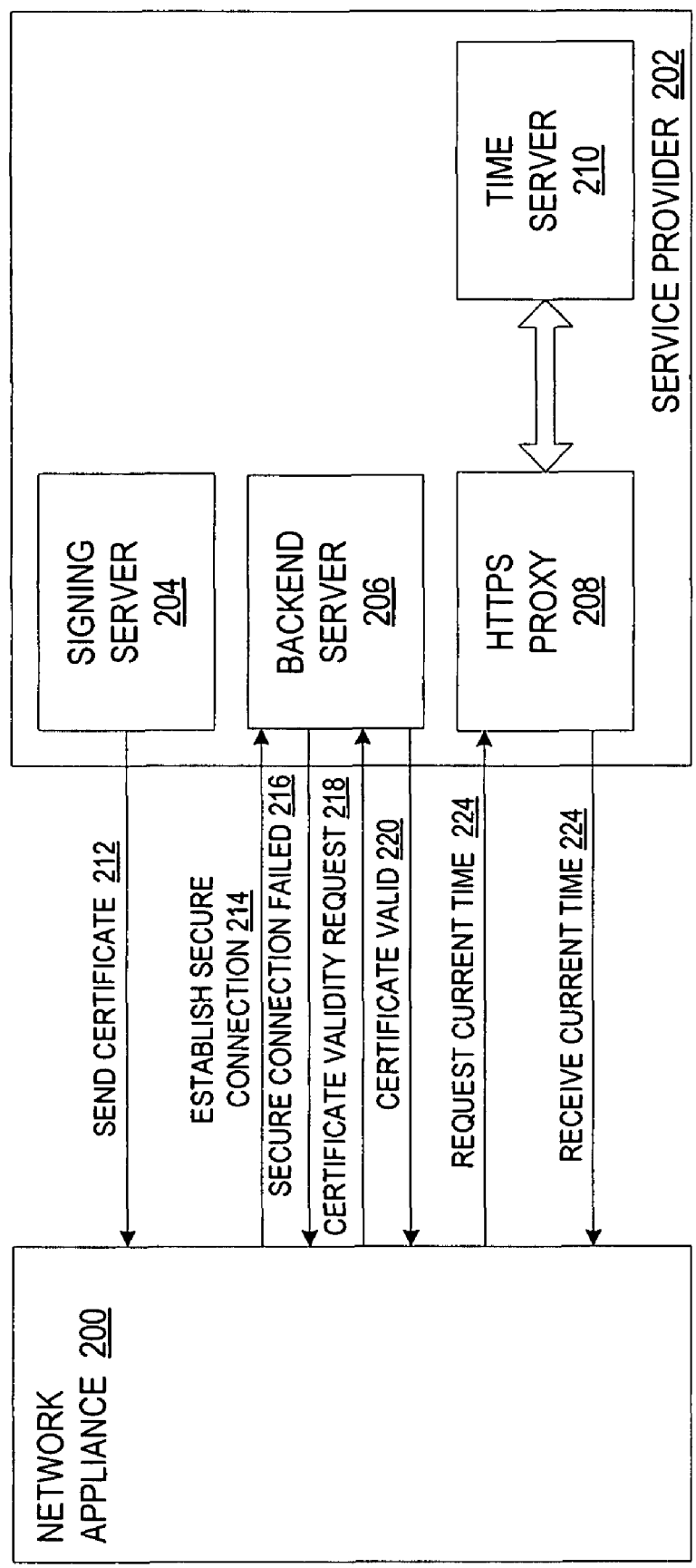

FIG. 2 illustrates a data flow diagram that shows data transmitted between a network appliance 200 and a service provider 202, in accordance with one embodiment of the present invention. Preferably, each transmission is achieved using a secure channel such as, for example, secure sockets layer (SSL), secure hypertext transfer protocol (HTTPS), etc. Alternatively, an unsecure channel may be used for transmission of, for example, an identity certificate.

Referring to FIG. 2, in a first transmission 212, a signing server 204 of the service provider 202 sends an identity certificate to the network appliance 200. The network appliance 200 stores the identity certificate locally and initiates a second transmission 214 to establish a secure connection with a back-end server 206 of the service provider 202 to obtain configuration information from the back-end server 206. The back-end server 206 may be accessible directly or via an https proxy (e.g., https proxy 208 or some other designated proxy). The back-end server 206 or the https proxy authenticates the network appliance 200 using its certificate.

If the authentication fails, the network appliance 200 is notified about the failure via an error response 216. The network appliance 200 then determines a possible cause of the failure. In one embodiment, the network appliance 200 initiates a fourth transmission 218 to inquire whether the certificate is valid (e.g., has not been revoked). The transmission 218 may be enabled via a separate SSL channel or an unsecure channel. A fifth transmission 220 from the back-end server 206 notifies the network appliance 200 that the certificate is valid.

Then, the network appliance 200 extracts time data (e.g., notValidBefore time) from the certificate and compares the time of the network appliance 200 with the time data extracted from the certificate. If the difference between the two times is significant (e.g., exceeds a predefined threshold), the network appliance 200 resets its time using the time data extracted from the certificate (e.g., the notValidBefore time or the notValidBefore time plus a predetermined offset), and initiates a next transmission 222 to request exact time from a time server 210 of the service provider 202.

The https proxy 208 receives the transmission 208 and performs authentication of the network appliance's certificate. If the authentication is successful, the https proxy 208 passes the request for the current time to the time server 210 and returns the current time to the network appliance 200 via a transmission 224. If the authentication is not successful, the https proxy 208 notifies the network appliance 200, which then adjusts its time (e.g., by incrementing it by a predefined interval, not exceeding the notValidAfter time from the certificate), and resubmits the request to the time server 210. Once the network appliance 200 receives the current time provided by the time server 210, the network appliance 200 resets its time to the current time and resubmits the transmission 214.

It should be noted that transmissions 214 through 224 may be repeated each time the network appliance 200 attempts to establish a secure connection with the service provider 202 or any other entity that trusts the signing server 204.

In an alternative embodiment, all communication goes through the https proxy 208. In addition, the network appliance 200 may not check the certificate status with the back-end server 206 until after the network appliance 200 has checked its time setting. Performing the time setting check before the status check can eliminate a status check step since the certificate can be valid when the time is incorrect. Further, the certificate status check may happen over a secure channel to ensure that the results have not been modified by an attacker (e.g., an attacker may disrupt communications with the back-end server 206 and provide a "certificate invalid" status to the network appliance 200, resulting in shutdown of the network appliance 200).

Figure 3:
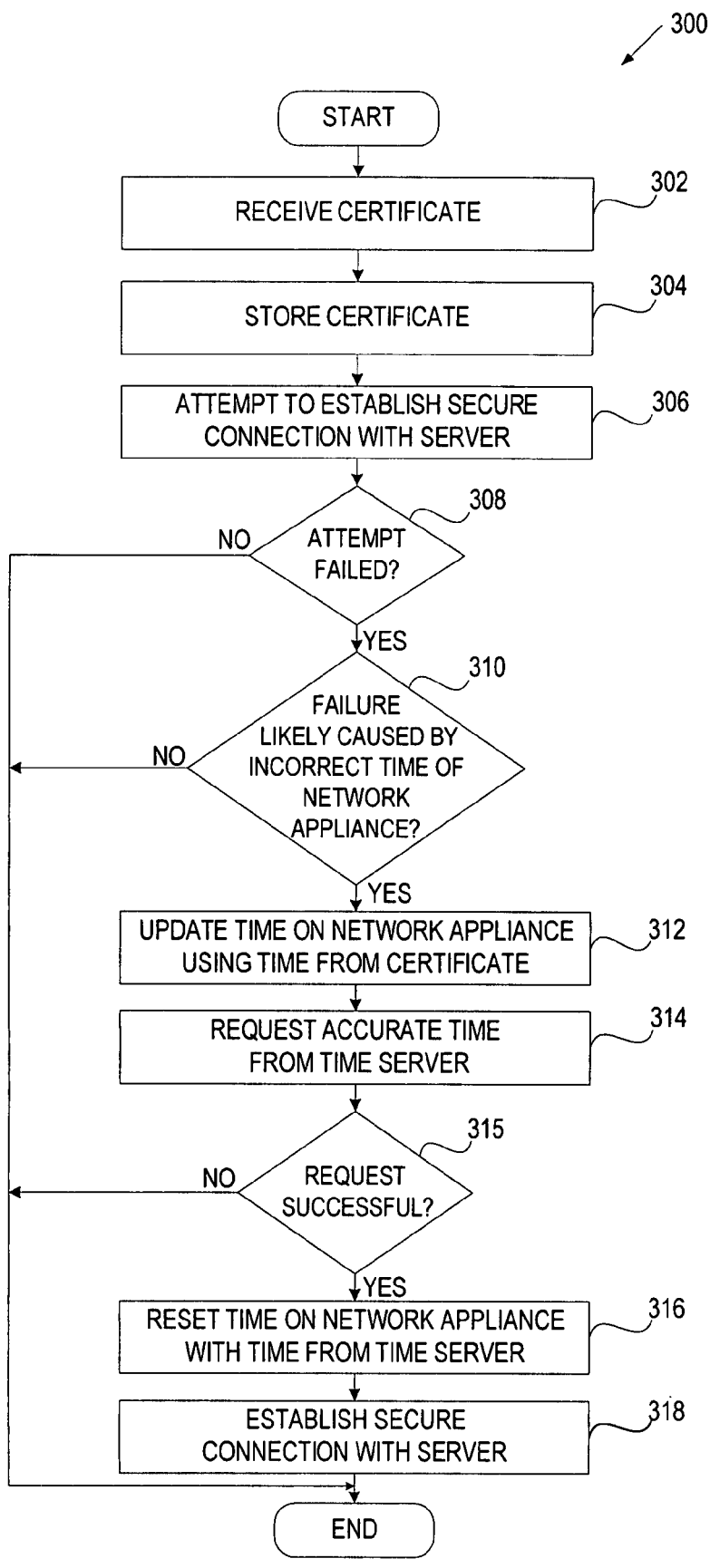

FIG. 3 is a flow diagram illustrating one embodiment of a method 300 for setting time on a network appliance based on a certificate issued for the network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a network appliance, such as a network appliance 102 of FIG. 1.

Referring to FIG. 3, method 300 begins with processing logic receiving an identity certificate issued for a network appliance by a certificate authority (e.g., a signing server of a service provider) (block 302). At block 304, processing logic stores the identity certificate in a local data storage. Processing logic then uses the identity certificate each time the identity certificate is needed for a certain operation of the network appliance. For example, processing logic may use the identity certificate each time it attempts to establish a secure connection with an entity trusting the certificate authority, as will be discussed in more detail below with reference to blocks 306 through 318.

At block 306, processing logic attempts to establish a secure connection with a server or proxy that trusts the certificate authority. At block 308, processing logic determines whether the attempt to establish a secure connection has failed. If not, method 300 ends. If so, processing logic proceeds to block 302 where it determines whether the failure was likely caused by incorrect time of the network appliance. One embodiment of a method for determining a possible cause of the failure will be discussed in more detail below in conjunction with FIG. 4.

If processing logic determines that the failure to establish a secure connection was caused by a factor other than incorrect time of the network appliance, method 300 ends. Otherwise, if processing logic determines that the failure to establish a secure connection was likely caused by incorrect time of the network appliance, processing logic proceeds to block 312, where it updates the time of the network appliance using time data extracted from the identity certificate of the network appliance (e.g., notValidBefore time).

At block 314, processing logic requests current time from a time server. If the request is successful (block 315), processing logic resets the time of the network appliance with the current time provided by the time server (block 316), and repeats its attempt to establish a secure connection with the server or proxy (block 318).

If the request sent at block 314 is unsuccessful, processing logic may determine a likely cause of the request failure. For example, the request may be unsuccessful if both the time is incorrect and the identity certificate is invalid (e.g., if the network appliance fails, the user re-provisions the network appliance on different hardware, and then brings the old network appliance back up with an inaccurate time). Processing logic may investigate this problem by requesting the status of the identity certificate as will be discussed in more detail below.

Figure 4:
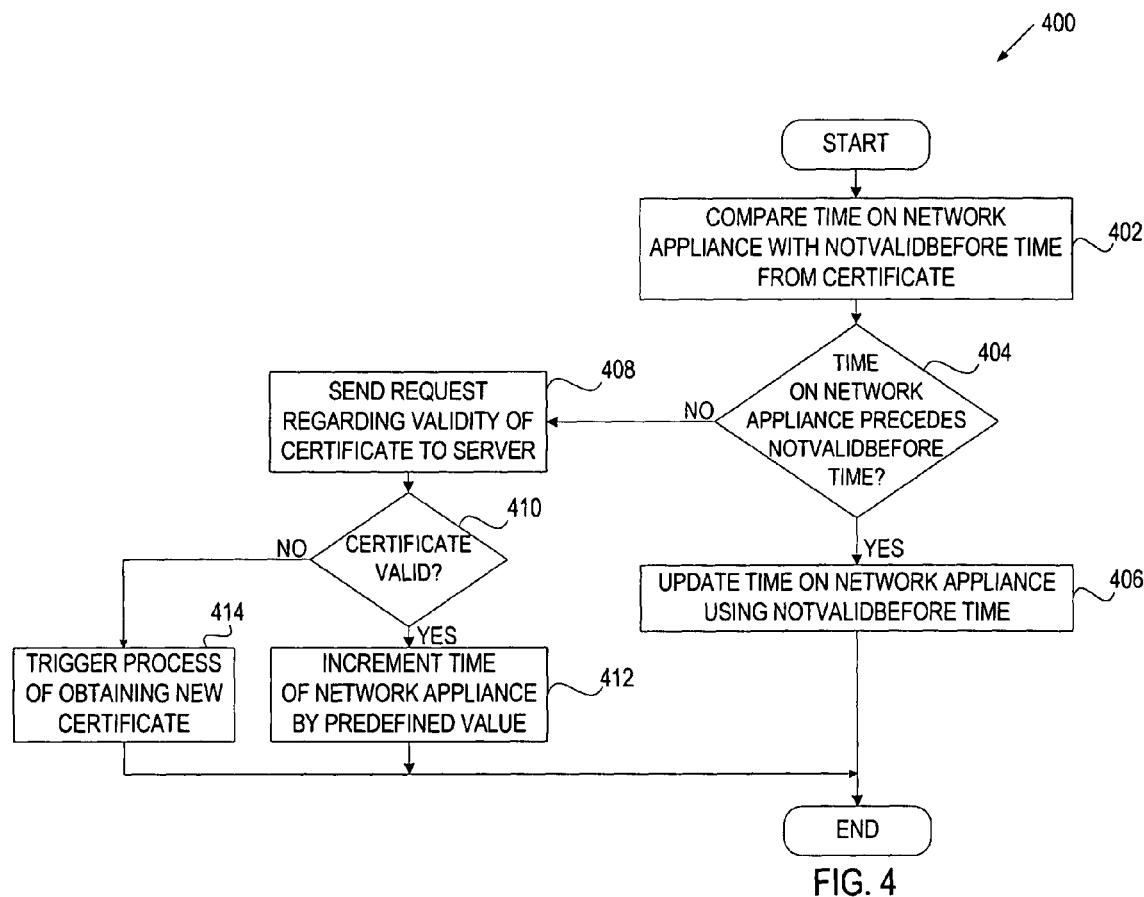

FIG. 4 is a flow diagram of one embodiment of a method 400 for determining a possible cause of a network appliance's failure to establish a secure connection with a server. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a network appliance such as a network appliance 102 of FIG. 1.

Referring to FIG. 4, method 400 begins with processing logic comparing the time of the network appliance with the notValidBefore time from a certificate issued for a network appliance (block 402). If the time of the network appliance precedes the notValidBefore time by at least a predefined threshold (block 404), processing logic decides that the failure to establish a secure connection was caused by incorrect time of the network appliance, and updates the time of the network appliance using the notValidBefore time (block 406). Otherwise, if the determination made at block 404 is negative, processing logic sends to a server a request regarding the status of the certificate (block 408). If the certificate is valid (block 410), processing logic increments the time of the network appliance by a predefined value, but not exceeding the notValidAfter time from the certificate (block 412). If the certificate is invalid (e.g., the certificate has been revoked or expired), processing logic initiates a process of obtaining a new certificate (block 414).

Figure 5:
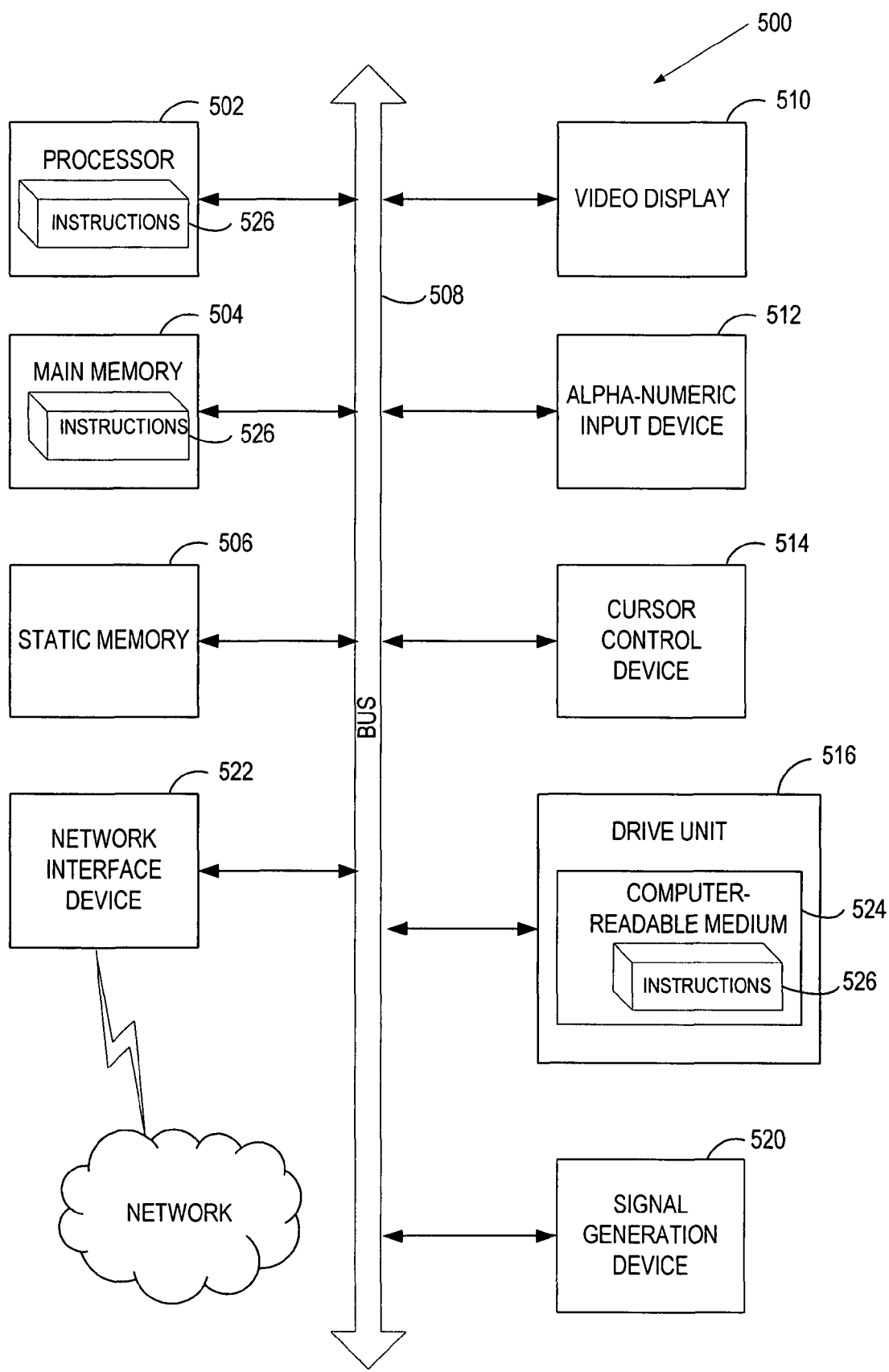

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a front end server 115, a back end server 125, a client 105, a network appliance 110, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
    when an attempt to establish a secure connection with a server using an identity certificate issued for a network appliance fails, determining whether the identity certificate is valid;
    if the identity certificate is valid, comparing time data of the network appliance with time data of the identity certificate, and determining from the comparison that a possible cause of the failure to establish the secure connection is incorrect time data of the network appliance;
    updating the time data of the network appliance to a preliminary time value using the time data of the identity certificate; and
    establishing, by the network appliance, a secure connection with a time server using the preliminary time value to request an accurate time value from the time server.

2. The method of claim 1 further comprising:
    receiving the identity certificate from the server; and
    storing the identity certificate in a local store on the network appliance.

3. The method of claim 1 wherein the time data contained in the identity certificate is a notValidBefore time.

4. The method of claim 1 wherein determining that a possible cause of a failure to establish the secure connection is incorrect time data provided by the network appliance comprises:
    retrieving a notValidBefore time from the identity certificate;
    comparing the time on the network appliance with the notValidBefore time; and
    determining that the time on the network appliance precedes the notValidBefore time.

5. The method of claim 1 further comprising:
    upon updating the time on the network appliance, requesting an accurate time value from a time server;
    updating the time on the network appliance with the time value received from the time server; and
    making a new attempt to establish the secure connection with the server.

6. The method of claim 5 wherein requesting the accurate time value from the time server comprises:
    sending a request with the identity certificate to an https proxy associated with the time server; and
    if the request is successful, receiving a response including an accurate time value from the time server.

7. The method of claim 6 further comprising:
    if the request is unsuccessful, receiving an error message indicating that an authentication of the network appliance by the https server has failed;
    determining an adjusted time data;
    reseting the time on the network appliance using the adjusted time data; and
    resubmitting a request for an accurate time value to the time server.

8. The method of claim 7 wherein determining the adjusted time data comprises:
    calculating the adjusted time data by incrementing a notValidBefore time from the identity certificate by a predefined time value; and
    verifying that the adjusted time data does not exceed a notValidAfter time from the identity certificate.

9. A non-transitory computer-readable storage medium including instructions that, when executed by a first machine, cause the first machine to perform a computer implemented method comprising:
    when an attempt to establish a secure connection with a server using an identity certificate issued for a network appliance fails, determining whether the identity certificate is valid;
    if the identity certificate is valid, comparing time data of the network appliance with time data of the identity certificate, and determining from the comparison that a possible cause of the failure to establish the secure connection is incorrect time data of the network appliance;
    updating the time data of the network appliance to a preliminary time value using the time data of the identity certificate; and
    establishing, by the network appliance, a secure connection with a time server using the preliminary time value to request an accurate time value from the time server.

10. The non-transitory computer-readable storage medium of claim 9 wherein the method further comprises:
    receiving the identity certificate from the server; and
    storing the identity certificate in a local store on the network appliance.

11. The non-transitory computer-readable storage medium of claim 9 wherein the time data contained in the identity certificate is a notValidBefore time.

12. The non-transitory computer-readable storage medium of claim 9 wherein determining that a possible cause of a failure to establish the secure connection is incorrect time data provided by the network appliance comprises:
    retrieving a notValidBefore time from the identity certificate;
    comparing the time on the network appliance with the notValidBefore time; and
    determining that the time on the network appliance precedes the notValidBefore time.

13. The non-transitory computer-readable storage medium of claim 9 wherein the method further comprises:
    upon updating the time on the network appliance, requesting an accurate time value from a time server;
    updating the time on the network appliance with the time value received from the time server; and
    making a new attempt to establish the secure connection with the server.

14. The non-transitory computer-readable storage medium of claim 13 wherein requesting the accurate time value from the time server comprises:
    sending a request with the identity certificate to an https proxy associated with the time server; and
    if the request is successful, receiving a response including an accurate time value from the time server.

15. The non-transitory computer-readable storage medium of claim 14 wherein the method further comprises:

if the request is unsuccessful, receiving an error message indicating that an authentication of the network appliance by the https server has failed;

determining an adjusted time data;

reseting the time on the network appliance using the adjusted time data; and resubmitting a request for an accurate time value to the time server.

16. The non-transitory computer-readable storage medium of claim 15 wherein determining the adjusted time data comprises:

alculating the adjusted time data by incrementing a notValidBefore time from the identity certificate by a predefined time value; and verifying that the adjusted time data does not exceed a notValidAfter time from the identity certificate.

17. A computing system, comprising:

a data store to store an identity certificate issued for a network appliance; and a time resetting module, coupled to the data store, to determine that an attempt to establish a secure connection with a server using the identity certificate has failed, to determine that the identity certificate is valid, to compare time data of the network appliance with time data of the identity certificate, to determine from the comparison that a possible cause of the failure to establish the secure connection is incorrect time data of the network appliance, to update the time data of the network appliance to a preliminary time value using the time data of the identity certificate, and to establish a secure connection with a time server using the preliminary time value to request an accurate time value from the time server.

18. The system of claim 17 wherein the time data contained in the identity certificate is a notValidBefore time.

19. The system of claim 17 wherein the time resetting module is to determine that a possible cause of a failure to establish the secure connection is incorrect time data provided by the network appliance by:

retrieving a notValidBefore time from the identity certificate;

comparing the time on the network appliance with the notValidBefore time; and determining that the time on the network appliance precedes the notValidBefore time.

20. The system of claim 17 wherein the time resetting module is further to request an accurate time value from a time server upon updating the time on the network appliance;

update the time on the network appliance with the time value received from the time server; and make a new attempt to establish the secure connection with the server.

21. The system of claim 20 wherein the time resetting module is to request the accurate time value from the time server by:

sending a request with the identity certificate to an https proxy associated with the time server; and if the request is successful, receiving a response including an accurate time value from the time server.

22. The system of claim 21 wherein the time resetting module is further to:

receive, if the request is unsuccessful, an error message indicating that an authentication of the network appliance by the https server has failed;

determine an adjusted time data;

reset the time on the network appliance using the adjusted time data; and resubmit a request for an accurate time value to the time server.

23. The system of claim 22 wherein the time resetting module is to determine the adjusted time data by:

calculating the adjusted time data by incrementing a notValidBefore time from the identity certificate by a predefined time value; and verifying that the adjusted time data does not exceed a notValidAfter time from the identity certificate.

* * * * *